United States Patent Office 2,943,113
Patented June 28, 1960

2,943,113

TRICYCLIC COMPOUNDS CONTAINING SUBSTITUTED HALOGEN

Louis Schmerling, Riverside, Ill., assignor, by mesne assignments, to Universal Oil Products Company, Des Plaines, Ill., a corporation of Delaware No Drawing. Filed Dec. 8, 1958, Ser. No. 778,618

4 Claims. (Cl. 260—648)

This application is a continuation-in-part of my copending application Serial No. 419,625, filed Mar. 29, 1954, which in turn is a continuation-in-part of application Serial No. 100,756, filed June 22, 1949, both of said earlier applications being now abandoned.

This invention relates to novel cyclic organic compounds containing chlorine in their structure and useful as chemical intermediates and as toxicants in insecticidal formulations. More specifically, the invention concerns chlorine-containing tricyclic compounds formed by a particular process involving the controlled condensation of a hexahalocyclopentadiene with a halogen-substituted cyclic mono-olefin and to insecticidal compositions containing said compounds.

This invention provides a series of compounds characterized generally as polycyclic compounds containing multiple nuclear halogen substituents on each ring. The present products are of tricyclic structure, formed by the condensation of a halogen-substituted cyclohexene with a hexahalocyclopentadiene at reaction conditions which result in the formation of an adduct having the following empirical formula:

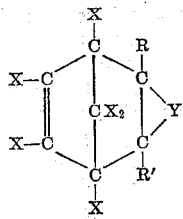

wherein X is a halogen selected from chlorine and bromine, R and R' are each independently selected from the group consisting of hydrogen, alkyl, halogen and haloalkyl containing not more than about three carbon atoms per alkyl or haloalkyl group and Y is a radical selected from the group consisting of alkylene and halogen-substituted alkylene containing four carbon atoms, at least one of said R, R' and Y substituents containing halogen. Typical representative alkylene and haloalkylene groups within the scope of the present invention are such radicals as: tetramethylene (—CH$_2$CH$_2$CH$_2$CH$_2$—), methyltetramethylene (—CH$_2$CH$_2$CH(CH$_3$)CH$_2$—), dichlorotetramethylene (—CH$_2$CHClCHClCH$_2$—), dichloromethyldibromotetramethylene (—CHBrCH$_2$CHCl$_2$CHBr—), etc.

In its broad aspects this invention concerns tricyclic, nuclearly halogen-substituted compounds of the following structure:

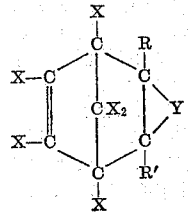

wherein X is a halogen selected from chlorine and bromine, R and R' are each independently selected from the group consisting of hydrogen, halogen, alkyl and haloalkyl and Y is a divalent saturated radical selected from the group consisting of alkylene and haloalkylene radicals, containing 4 carbon atoms, at least one of said R, R' and Y radicals containing a halogen.

Other embodiments of the invention relate to the process for preparing said tricyclic, nuclearly halogen-substituted compounds which comprises reacting a hexahalocyclopentadiene with a halogen-substituted cyclohexene at condensation reaction conditions, preferably at a temperature of from about 100° to about 300° C., at a pressure sufficient to maintain the reactants in substantially liquid phase, and utilizing a molar ratio of said cyclohexene to hexahalocyclopentadiene equal to at least 1 to 1.

The present polycyclic, halogen-containing compounds are formed by the controlled thermal condensation of hexachloro- or hexabromocyclopentadiene with a halocyclohexene at reaction conditions which yield an adduct of the Diels-Alder type, the resulting adduct being a tricyclic polyhalogen-substituted compound containing a single olefinic double bond in one of the carbocyclic rings. The reaction is believed to proceed in accordance with the following reaction mechanism, although it is not intended that such proposed mechanism for the reaction in any way be interpreted to restrict the scope of this invention necessarily to compounds of such specific structure or to restrict the process of the present invention necessarily to such mechanism:

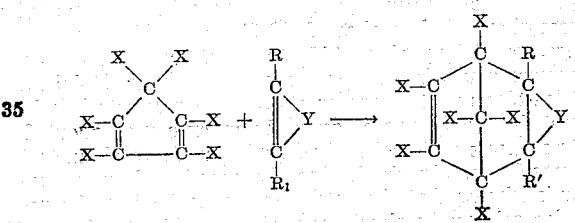

wherein X, R, R' and Y are identified as previously indicated. The fact that the present condensation reaction occurs to any appreciable extent when the halo-olefin is a halocyclohexene is surprising in view of statements in the prior art (viz., Advanced Organic Chemistry, Reynold C. Fuson, Wiley & Sons, Inc., 1950, page 63 and in a paper by Bergmann and Weizmann, J. Org. Chem., 9, 352 (1944)) that cyclohexenes do not act as dienophiles in the Diels-Alder condensation reaction. It is thus unexpected that halogen-substituted cyclohexenes react in a Diels-Alder type of condensation reaction with the class of dienes specified in the present invention, that is, the hexahalocyclopentadienes to form the corresponding adducts thereof. Although an extremely reactive diene: bicyclohexenyl was utilized as the intended diene reactant in the experiments described in the foregoing references, cyclohexene failed to undergo any condensation with the diene in the attempted condensation reaction. Contrary to the anticipated inertness of cyclo-olefins in condensation reactions with dienes, it has now been found that such condensation does in fact occur, accompanied by an appreciable yield of product, when the condensation reaction involves a hexahalocyclopentadiene and a halocyclohexene and, further, when the condensation is carried out at the present selective reaction conditions.

Although hexachlorocyclopentadiene is preferred in the present process as the dienic reactant because of its availability in commercial quantities and because of the highly effective insecticidal properties of its condensation products with halocyclo-olefins, hexabromocyclopentadiene or other hexahalocyclopentadienes containing both chloro and bromo substituents, such as 3,4-dibromotetrachlorocyclopentadiene, may likewise be utilized in the reaction to provide bromine-containing tricyclic compounds having molecular structures similar to the condensation products of the corresponding hexachlorocyclopentadiene reactant.

Suitable halogen-substituted cyclicmono-olefins utilizable in the present condensation reaction with hexahalocyclopentadienes are selected from the mono-, and polyalkyl, haloalkyl-substituted cyclohexenes as well as the mono- and polyfluoro, chloro-, and bromo-substituted cyclohexenes; that is, halocyclo-olefins containing a six-membered carbon atom ring, including, for example, 1,2-dichlorocyclohexene, 3,4-dichlorocyclohexene, 1,2-dibromocyclohexene, 1,2-difluorocyclohexene, 4,5-difluorocyclohexene, 3,3,4,5-tetrachlorocyclohexene, 4-trifluoromethyl-5,6-dichlorocyclohexene, 1,2,3,5-tetrabromocyclohexene, 1,2-difluoro-4-methylcyclohexene, 4-isopropyl-5,6-dichlorocyclohexene, 2,3-dichloro-5,6-dibromocyclohexene, 1-chloro-3,3,6,6-tetramethylcyclohexene, 4-chloro-3,3,5,6-teteramethylcyclohexene, 4,5-dichloro-3,3,5,6-tetramethylcyclohexene, 3,4-dichloro - 5,6 - dimethylcyclohexene and other homologous and analogous halocyclohexenes. Although the halocyclohexene reactant may contain alkyl substituents on the carbocyclic ring, such alkyl groups preferably contain a maximum of not more than about 3 carbon atoms, since the reactivity of these cyclo-olefins tends to decrease as the length of the substituent alkyl groups on the cyclohexene nucleus increases. These halocycloolefins may be supplied to the condensation reaction in their substantially chemically pure form, as concentrates thereof, in admixtures with other hydrocarbons, or as mixtures of each other.

The condensation reaction provided herein between the hexahalocyclopentadiene and the halogen-substituted cyclohexene reactants is effected at a temperature of from about 100° to about 300° C., preferably at a temperature of from about 150° to about 200° C. and at a pressure which is preferably superatmospheric, sufficient, at least, to maintain one or more of the reactants in substantially liquid phase, generally in excess of about 2 atmospheres and preferably from about 10 to about 100 atmospheres. In conducting the reaction, it is an essential factor that the rate of applying heat to the reaction mixture be closely controlled in order to obtain a significant yield of condensation product and to prevent undesirable side reactions. In the case of indiscriminate heating of the reaction mixture in which the exothermic heat of the condensation reaction introduces an additive effect in the rate of reaction temperature increase, the reaction product includes a large proportion of carbonaceous material, indicating substantial decomposition of the reactants and/or product during the development of the high temperatures in the reaction mixture. Observations have shown that the rate of temperature increase in the mixture of reacting components in the generally critical temeprature range of from about 120° to about 200° C., during which the rate of the condensation reaction is greatest, is usually preferably maintained at from about 0.1 to about 2.0 degrees per minute, and preferably at a rate of from about 0.3 to about 0.7 degree centigrade per minute. However, generally higher rates of heating may be employed if an efficient means of removing the exothermic heat of reaction is provided. Although an approximately equimolar ratio of the reactants may be utilized to effect an almost quantitative conversion to the desired condensation product, it is preferred to maintain the proportion of the halocyclohexene reactant to the hexahalocyclopentadiene reactant during the reaction at a somewhat higher molar ratio of from about 1.5 to 1 to about 10 to 1 in order to consume the hexahalocyclopentadiene reactant substantially to completion during the reaction. The excess of the halocyclohexene reactant provides an effective diluent of the reaction mixture, enabling the rate of the resulting exothermic reaction to be controlled within the desired limits and also establishes a desirable mass action effect in the reaction mixture. In thus substantially removing the hexahalocyclopentadiene component from the reaction mixture by virtue of its condensation with an excess of the halocyclohexene reactant, the subsequent problem of separating the product from the reaction mixture is simplified, since the excess of cyclohexene, usually the most volatile component of the reaction mixture, may be recovered therefrom by merely distilling the same from the reaction mixture, leaving a residue consisting predominantly of product. The latter residue may thereafter be further purified, for example, by distillation, recrystallization, extraction or by other means well known to the art, or may be utilized directly without further treatment or purification for the preparation of an insecticidal composition therefrom.

The physical properties of the present condensation products and the effect they have on entomological forms of life make them particularly desirable as insecticides and insect repellents. The combination of properties which the present products exhibit make them particularly effective as insecticides in that they provide many of the features desired of compounds for this purpose. The present products are, for example, highly toxic to insects which are destructive of plant life and property normally subject to insect infestation, their toxic effect being manifested by mere contact of the poison with the insect. The present insecticidal products are thus effective against chewing as well as sucking types of insects. The compounds are sufficiently volatile that when applied to plant life intended for subsequent human consumption, the plant when harvested and after allowing a reasonable time for evaporation of the applied compound therefrom retains none of the insecticide to prevent use of the plant for animal consumption. On the other hand, the compounds are of sufficiently limited volatility to be retained on the insect or on the plant for the time required to accomplish the toxic effects of the insecticide. The volatility and retentive capacity of the compounds may be varied at will by combining them with suitable fixing agents which reduce or promote their volatilization, as desired. Thus, the compounds may be dissolved in a suitable liquid solvent, such as a mineral or vegetable oil, petroleum, etc., a wax, such as a paraffin wax, beeswax, etc., a high molecular weight alcohol or ether such as myricyl alcohol, dibutyl ether, etc. or they may be emulsified with water or combined with an oil and emulsified with water by the addition of an emulsifying agent, such as a surface active agent, to the mixture. The latter solvents and dispersants, referred to as a suspending agent, may also be employed for the specific purpose of reducing the concentration of the compound in an insecticidal composition to a particular desired level. The compounds, for example, may be formulated into compositions containing the active component in a concentration sufficient to take advantage of its maximum efficacy, which at certain optimum concentrations has the desired toxic effect. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of the active component in the formulation may be as low as about 0.1% as for example, in the treatment of fabrics for destroying moth larvae. In general, in utilizing the present insecticidal compounds against most insects, a composition containing from about 1% to about 5% by weight of the active component is highly effective.

The choice of the most suitable solvent or dispersant further depends upon the method to be utilized to apply the composition to the infested article. For example, a lower molecular weight, gaseous carrying agent for the active component, such as butane, Freon, etc. may be compressed and liquefied into a small bomb containing the insecticidal compound. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, etc., and the resultant solution atomized by a suitable spraying device.

The insecticidal properties of the compounds of the present invention may be modified, by subjecting them to further reaction such as nitration, hydrogenation, hydroxylation, partial dehydrohalogenation, halogenation (particularly chlorination) etc.

This invention is further described by reference to the following illustrative examples which, although indicative of typical representative compounds of the present invention, are nevertheless not intended to limit the generally broad scope of the invention in strict accordance therewith.

*Example I*

A product believed to be predominantly 1,2,3,4,6,7,9,9-octachloro-1,4,4a,5,6,7,8,8a-octahydro-1,4 - methanonaphthalene is prepared by the thermal condensation of hexachlorocyclopentadiene with trans-4,5-dichlorocyclohexene (produced by the condensation of butadiene with trans-dichloroethylene), the reaction being effected by heating a mixture of the reactants at the reflux temperature of the mixture for 2 hours, during which time the temperature rises from about 155° C. to about 250° C. Rhombic crystals of the product separate on cooling the reaction mixture. The product which is separated from the crude mixture by filtration may be recrystallized from methanol to yield a white crystalline material melting at 110–111° C. Analysis indicates that the product has the following composition: Found: C, 31.64; H, 2.27. Calculated for $C_{11}H_8Cl_8$: C, 31.17; H, 1.90. The product has specific insecticidal activity against houseflies, giving 100% knockdown in 2 hours with 100% kill in 24 hours at 1% concentration of the insecticide and 50% knockdown in 2 hours with 100% kill in 24 hours at 0.1% concentration, the test solutions being prepared by dissolving the insecticide in an approximately equal weight of benzene and then emulsifying with water, using Triton X–100 as emulsifying agent.

Similar insecticidal activity is shown for the condensation product of the bromo-analog of hexachlorocyclopentadiene and 4,5-dichlorocyclohexene, as well as for the adduct of the bromo-analog with 4,5-dibromocyclohexene.

*Example II*

A product characterized as 1,2,3,4,9,9-hexachloro-4a,8a-difluoro-1,4,4a,5,6,7,8,8a-octahydro-1,4- methanonaphthalene having the following empirical structure:

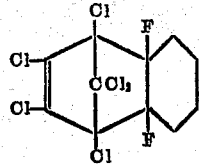

is formed by the condensation of hexachlorocyclopentadiene with 1,2-difluorocyclohexene, the condensation reaction being effected by refluxing a solution of the reactants in xylene (at about 140–142° C.) for 12 hours. The product which is separated from the reaction mixture at reduced pressure distillation is a white crystalline material which has insecticidal activity when tested as a 3.5% emulsion of the same with one part by volume of water and 10 parts by volume of soybean oil against houseflies, ticks, and Mexican bean beetles.

*Example III*

A condensation reaction is obtained with the formation of 1,2,3,4,6,6,7,9,9-nonachloro-1,4,4a,5,6,7,8,8a-octahydro-1,4-methanonaphthalene, by reacting hexachlorocyclopentadiene with 4,4,5-trichlorocyclohexene (formed by condensing butadiene with trichloroethylene) in a xylene solution of the reactants at the reflux temperature of the xylene solvent, the reaction being run for a period of 16 hours, using a molar ratio of the chlorocyclo-olefin to diene of about 2.5 to 1. Following the indicated reaction period, the xylene solvent is distilled from the reaction mixture and the product separated from the residue by fractional distillation at reduced pressure.

I claim as my invention:

1. A tricyclic, nuclearly halogen-substituted compound of the following structure:

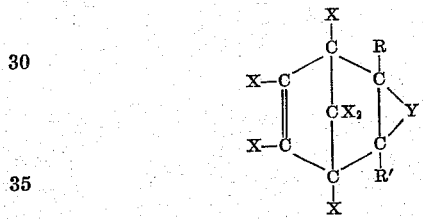

wherein X is a halogen selected from the group consisting of chlorine and bromine, R and R' are independently selected from the group consisting of hydrogen, a halogen selected from the group consisting of fluorine, chlorine, and bromine, alkyl and haloalkyl and Y is a divalent saturated radical containing 4 carbon atoms and selected from the group consisting of alkylene and haloalkylene, at least one of said R, R' and Y containing a halogen.

2. 1,2,3,4,6,7,9,9 - octachloro - 1,4,4a,5,6,7,8,8a - octahydro-1,4-methanonaphthalene.

3. 1,2,3,4,9,9 - hexachloro - 4a,8a - difluoro - 1,4,4a,5,6,7,8,8a-octahydro-1,4-methanonaphthalene.

4. 1,2,3,4,6,6,7,9,9 - nonachloro - 1,4,4a,5,6,7,8,8a - octahydro-1,4-methanonaphthalene.

References Cited in the file of this patent

UNITED STATES PATENTS 2,635,979    Lidov _____ Apr. 21, 1953